United States Patent
Sarashina et al.

(10) Patent No.: US 8,559,459 B2
(45) Date of Patent: Oct. 15, 2013

(54) DYNAMIC BANDWIDTH ALLOCATING CONTROL APPARATUS WITH BANDWIDTH USABILITY IMPROVED

(75) Inventors: Masahiro Sarashina, Saitama (JP); Akihiro Takahashi, Saitama (JP); Satoshi Furusawa, Chiba (JP); Akiya Suzuki, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 223 days.

(21) Appl. No.: 13/154,790

(22) Filed: Jun. 7, 2011

(65) Prior Publication Data

US 2012/0051371 A1     Mar. 1, 2012

(30) Foreign Application Priority Data

Aug. 30, 2010   (JP) ................................. 2010-191788

(51) Int. Cl.
    *H04J 3/16*            (2006.01)
    *H04J 3/22*            (2006.01)
    *H04W 4/00*           (2009.01)

(52) U.S. Cl.
     USPC ......................................... 370/468; 370/328

(58) Field of Classification Search
     USPC ......................................... 370/328, 465, 468
     See application file for complete search history.

(56) References Cited

U.S. PATENT DOCUMENTS

| | | | | |
|---|---|---|---|---|
| 2002/0169890 A1* | 11/2002 | Beaumont et al. | | 709/245 |
| 2006/0023656 A1* | 2/2006 | Anglin | | 370/328 |
| 2007/0071031 A1* | 3/2007 | Shin et al. | | 370/468 |
| 2007/0122151 A1 | 5/2007 | Watanabe | | |
| 2007/0237091 A1* | 10/2007 | Lin et al. | | 370/252 |
| 2011/0134878 A1* | 6/2011 | Geiger et al. | | 370/330 |

OTHER PUBLICATIONS

Daisuke Murayama, et al., "Dynamic bandwidth allocation to extend the applicability domain of EPON", The Institute of Electronics, Information and Communication Engineers, Technical Report, CS2009-67, Jan. 2010, pp. 1-6.

* cited by examiner

*Primary Examiner* — Ronald Abelson
(74) *Attorney, Agent, or Firm* — Rabin & Berdo, P.C.

(57) ABSTRACT

A bandwidth allocating control apparatus for use in an optical communication base station has its reception bandwidth divided into a bandwidth for short distance and a bandwidth for long distance. A residual bandwidth calculator calculates a residual bandwidth remaining unallocated in the bandwidth for short distance after having allocated the reception bandwidth to short-distance subscriber terminal units. A middle-distance subscriber terminal classifier uses a middle-distance boundary calculation model representing the relationship between the residual bandwidth and a communication distance from the base station to the subscriber terminal units to further classify long-distance subscriber terminal units into a middle-distance subscriber terminal unit and a long-distance subscriber terminal unit. A middle-distance bandwidth allocator further allocates the residual bandwidth to the middle-distance subscriber terminal unit in addition to a predetermined bandwidth allocated thereto.

9 Claims, 9 Drawing Sheets

DYNAMIC BANDWIDTH ALLOCATING CONTROL APPARATUS WITH BANDWIDTH USABILITY IMPROVED

BACKGROUND OF THE INVENTION

1. Field of the Invention

The present invention relates to a bandwidth allocating control apparatus, and more particularly to a bandwidth allocating control apparatus included in an optical line terminal (OLT) which is arranged in a central office of a communication carrier and connected to a plurality of optical network units (ONUs) located on subscriber premises by a passive optical network (PON) to form an optical access system.

2. Description of the Background Art

A PON system using a time division multiplex (TDM) technology is widely utilized as a system for inexpensively constituting an optical access network. As one of the TDM-PON system, the GE-PON (Gigabit Ethernet (trademark)-PON) system has been widely popularized in Japan.

In the GE-PON system, bandwidths for the up-stream direction are allocated to the respective ONUs connected to a telecommunications network. One of the methods for allocating bandwidths is dynamic bandwidth allocation (DBA). The DBA attains an efficient bandwidth allocation by an OLT grasping the amounts of traffic raised in the respective ONUs, or the amounts of transmissions requested by the respective ONUs. In this case, in order to report the amount of traffic from the ONUs to the OLT and bandwidths to be allocated from the OLT to the ONUs, REPORT and GATE frames, respectively, are used which are regulated by the IEEE (Institute of Electrical and Electronics Engineers) 802.3av and IEEE 802.3ah STD.

More specifically, ONUs transmit REPORT frames to the OLT in order to notify the OLT of the amounts of traffic raised in the ONUs. The OLT receives the REPORT frames from the ONUs in time slots respectively allotted in advance to the ONUs. The OLT proceeds to computation through the DBA to thereby assign bandwidths to the respective ONUs. The DBA is performed in periodic time intervals called grant periods. The bandwidths thus assigned will be used in grant periods following thereto for receiving information on the amounts of traffic from the ONUs. The OLT transmits GATE frames to the ONUs to notify the latter of the bandwidths thus assigned. Each of the ONUs will know from a GATE frame when to transmit a REPORT frame and up-stream traffic, or data, in the following grant period, and proceed to the transmission.

The GE-PON system is desired to expand its service areas. However, the extension of a distance from the OLT to an ONU may cause a longer time to be taken from transmission to arrival of GATE and REPORT frames, thus requiring a grant period to be lengthened to the extent of problematically delaying data to arrive. Note that this problem is raised not only in the GE-PON but also, for example, a 10GE-PON attaining a bit rate of 10 Gbps.

In order to expand the service area of a GE-PON system, U.S. Patent Application Publication No. US 2007/0122151 A1 to Watanabe proposes a bandwidth allocating control apparatus having its bandwidth divided into bandwidths for short and long distances, which will be allocated to the respective ONUs according to the distances from the OLT to the ONUs. That solution is also disclosed by Daisuke Murayama, et al., "Dynamic bandwidth allocation to extend the applicability domain of EPON" The Institute of Electronics, Information and Communication Engineers, Technical Report, CS2009-67 (January 2010), pp. 1-6.

However, in the bandwidth allocating control apparatus disclosed in Watanabe, and Murayama, et al., an allocatable bandwidth is divided into bandwidths for short and long distances, which will, respectively, be allocated to a short- and a long-distance ONU, i.e. optical communication units. Therefore, for example, when having allocated all the short-distance ONUs to appropriate bandwidths with an unallocated, or residual, bandwidth or bandwidths remaining, the remaining bandwidths would not efficiently be utilized. Thus, the existence of such residual bandwidths may reduce the bandwidth usability, which may be problematic.

SUMMARY OF THE INVENTION

It is an object of the present invention to provide a bandwidth allocating control apparatus that can reduce a residual bandwidth to thereby improve the bandwidth usability.

In accordance with the present invention, a bandwidth allocating control apparatus for use in an optical communication base station forming an optical access system together with a plurality of optical communication subscriber terminal units and connected communicable with the subscriber terminal units, wherein the apparatus has a reception bandwidth from the subscriber terminal units divided into a bandwidth for short distance and a bandwidth for long distance, and the apparatus is responsive to a data transmission request received from any one of the subscriber terminal units to allocate the reception bandwidth on a basis of a communication distance from the base station to the one subscriber terminal unit so that, when the one subscriber terminal unit is classified into a short-distance subscriber terminal class, the bandwidth for short distance is allocated to the one subscriber terminal unit corresponding to a volume of data the one subscriber terminal unit requests to transmit, and, when the one subscriber terminal unit is classified into a long-distance subscriber terminal class, a predetermined bandwidth in the bandwidth for long distance is allocated to the one subscriber terminal unit. The apparatus comprises: a residual bandwidth calculator for calculating a residual bandwidth of the bandwidth for short distance remaining unallocated after having allocated the reception bandwidth to the one subscriber terminal unit, when classified into the short-distance subscriber terminal class; a middle-distance subscriber terminal classifier for using a middle-distance boundary calculation model defining a relationship between the residual bandwidth and the communication distance to further classify the one subscriber terminal unit, when classified into the long-distance subscriber terminal class, into a middle-distance subscriber terminal class or the long-distance subscriber terminal class; and a middle-distance bandwidth allocator for further allocating the residual bandwidth to the one subscriber terminal unit, when classified into the middle-distance subscriber terminal class in addition to the predetermined bandwidth allocated.

In accordance with the present invention, residual one or ones of the bandwidths for short distance can be allocated to some of the long-distance optical communication subscriber terminal units. Therefore, residual one or ones of the bandwidths for short distance, which would not be utilized in the prior art, can be utilized, thus improving the bandwidth usability.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
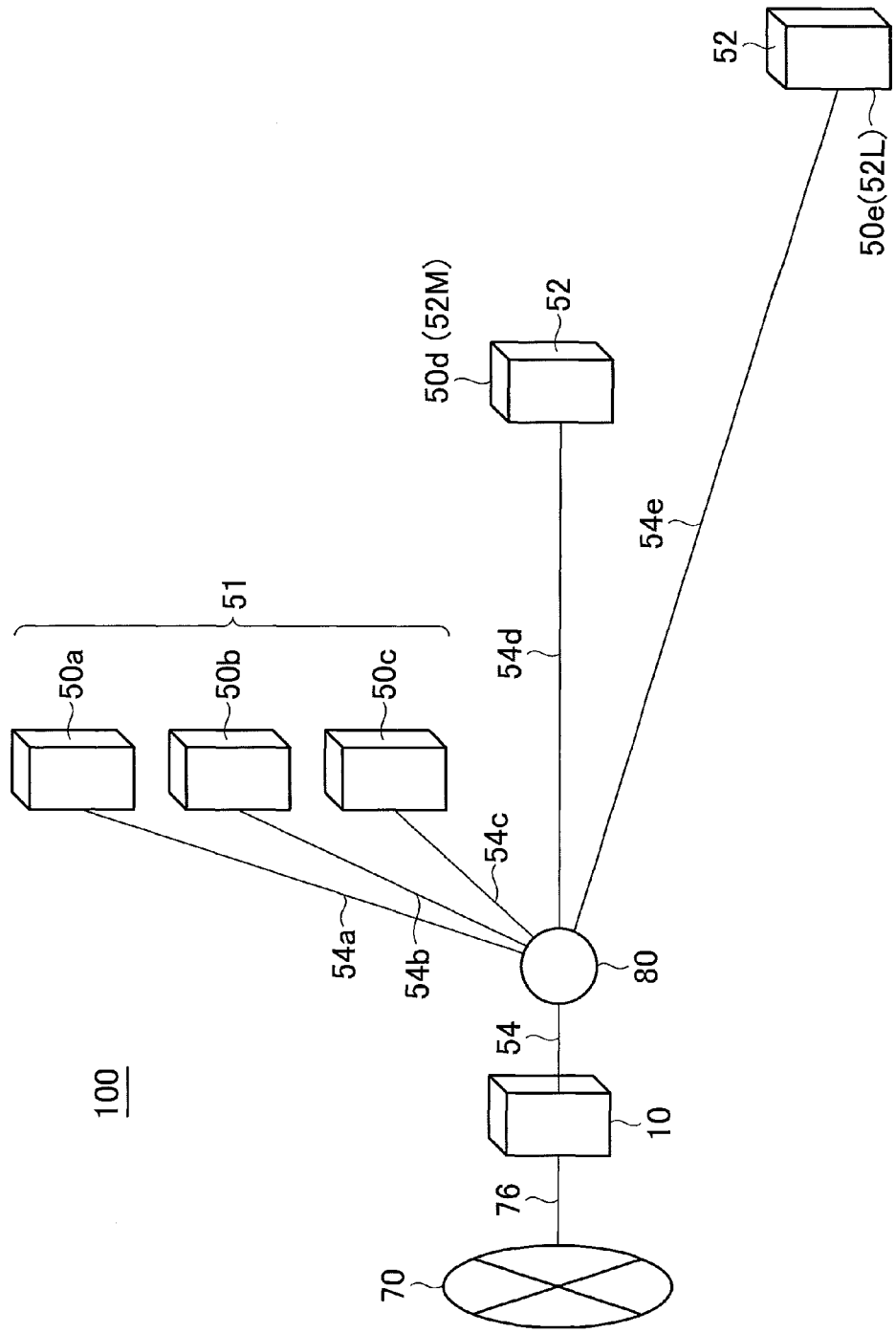
FIG. 1 is a schematic block diagram showing the configuration of a GE-PON, or optical access, system, including an OLT in accordance with an illustrative embodiment of the present invention.

Now, a preferred embodiment of the present invention will be described in detail with reference to accompanying drawings. In the figures, the components and elements are merely schematically depicted to the extent that the present invention can be sufficiently understood. Therefore, the present invention is not to be restrictively comprehended only by the illustrated embodiment. In the description and drawings, like components and elements are designated with the same reference numerals, and repetitive descriptions thereon will be refrained from.

FIG. 1 shows, as an example of time division multiplex-passive optical network (TDM-PON) system, a GE-PON (Gigabit Ethernet (trademark)-PON) system 100 in accordance with the illustrative embodiment, which includes an optical line terminal (OLT) 10 connected to a plurality of optical network units (ONUs), generally 50, through an optical coupler 80 by optical fiber cables 54 and 54a, 54b, 54e. For illustration purpose only, FIG. 1 shows those cables not in proportional in length to optical fiber cables included in GE-PON systems applied in practice. The numbers of the ONUs and optical fiber cables are also illustrative. The present invention may not be restricted to those specific lengths and numbers.

The OLT 10 is a kind of optical communication unit arranged in a central office as a base station of a communication carrier, and is connected to ONUs 50a, 50b, . . . , 50e via the optical coupler 80 by the optical fiber cables 54, 54a, . . . 54e. The ONUs 50a, 50b, . . . , 50e are another kind of optical communication units located in subscriber premises as terminator units. In the embodiment, the ONUs 50a, 50b and 50c are located relatively at short distances from the OLT 10, and may generally be referred to as short-distance ONUs 15. The ONUs 50d and 50e are at middle and long distances from the OLT 10, and may generally be referred to as middle- and long-distance ONUs 52M and 52L, respectively, and both called long-distance ONUs 52 in generic. Those ONUs, sometimes designated generally with a reference numeral 50, may be interconnected to respective subscriber terminal personal computers, not shown, operable by subscribers.

The OLT 10 is connected by a communication line 76 to a telecommunications network, preferably an Internet protocol (IP) network 70, such as a wide area network (WAN) or the Internet. The subscribers can operate their subscriber terminal personal computers, acting as clients, to thereby acquire requested information through the ONU 50, the optical coupler 80 and the OLT 10 over the network 70 from a server, not shown. In the instant illustrative embodiment, the OLT 10 may be of a bit rate of 10 Gbps, and the GE-PON system 100 may be an optical access system.

In accordance with the instant illustrative embodiment, the OLT 10 plays the role of a bandwidth allocating control apparatus which has its reception bandwidth, i.e. bandwidth for up-stream direction, allocatable on the transmission line 54 to the respective ONUs 50 classified into a bandwidth or bandwidths for short distance and a bandwidth or bandwidths for long distance. The bandwidths in the instant embodiment may be defined by bandwidth values represented in Mbps, as exemplarily shown in FIG. 4.

Figure 2A:
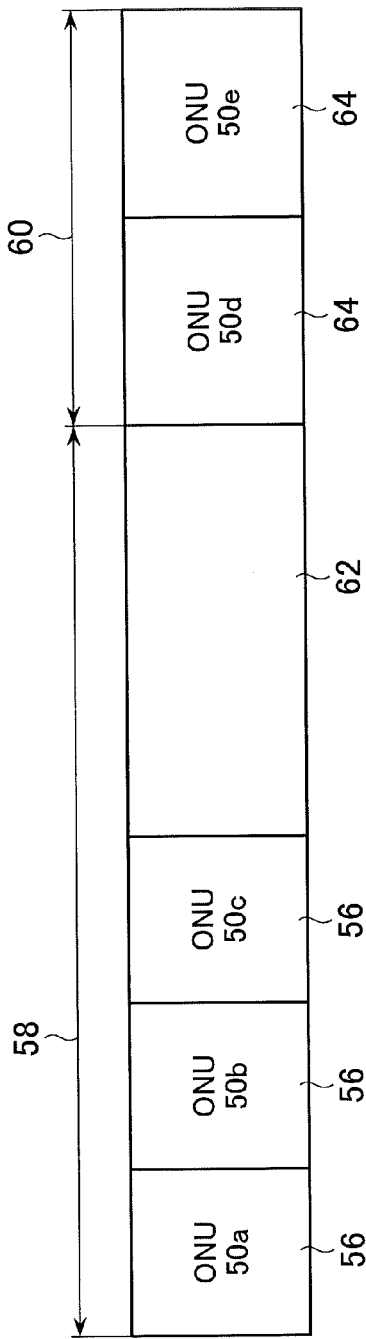
FIGS. 2A and 2B conceptually show bandwidths for use in the illustrative embodiment shown in FIG. 1 useful for understanding how the bandwidths are allocated to ONUs.
Figure 2B:
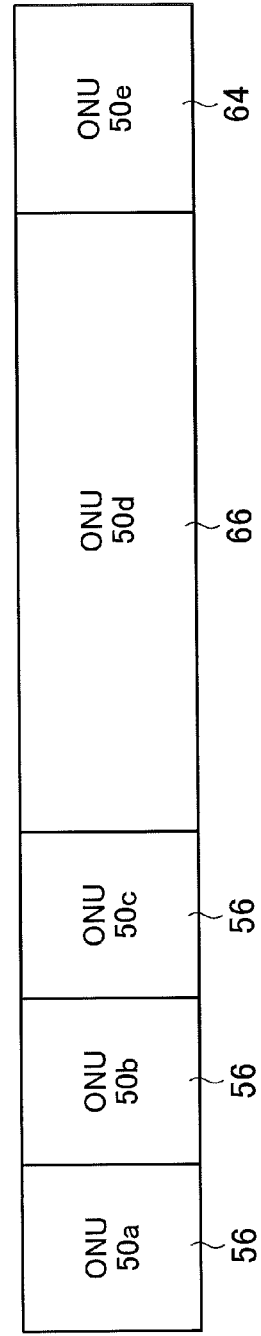

Specifically with reference to FIG. 2A, the OLT 10 may be responsive to a bandwidth allocation request, i.e. the amount of transmission requested, when received from the ONUs 50, to allocate the short-distance ONUs 50a, 50b and 50c to respective ones 56 of the bandwidths for short distance 58, while, at first, allocating the middle- and long-distance ONUs 50d and 50e to predetermined bandwidths 60, namely, bandwidths having the bandwidth values thereof fixed or predetermined for long distance. In this stage, if the OLT 10 receives bandwidth allocation requests from the ONUs 50a, 50b and 50c positioned at the short distance fewer than the allocatable bandwidths for short distance 58, as exemplarily shown in the figure, some of the bandwidth or bandwidths for short distance 58 would have remained unused as a residual bandwidth or bandwidths 62. The residual bandwidth 62 will be allocated to one or ones of the ONUs 50 satisfying a predetermined condition and positioned at a distance, i.e. middle distance, relatively closer to the short distance. Specifically in this example, among the ONUs 50d and 50e positioned at the long distance, the ONU 50d is allotted to the remaining bandwidth 62 in addition to one 64 of the bandwidths for long distance 60 already allocated to thereby obtain a resultant bandwidth 66, as shown in FIG. 2B. With the instant illustrative embodiment, the OLT 10 is thus improved in bandwidth usability. In the context, such a bandwidth having its bandwidth value fixed, or predetermined, for long distance as stated above may sometimes be referred to as predetermined bandwidth.

Figure 9:
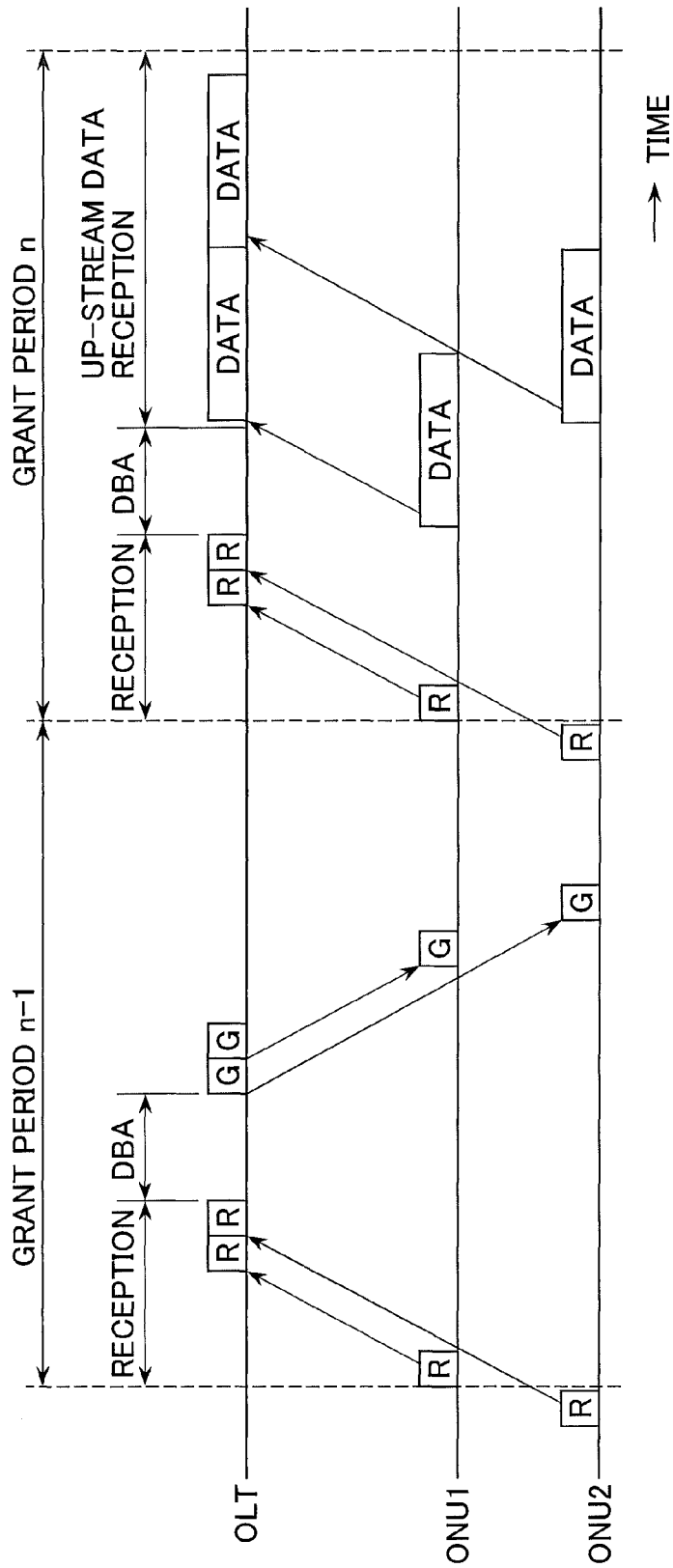
FIG. 9 is a sequence chart useful for understanding conventional communications between an OLT and ONUs on bandwidths for up-stream direction.

In order to facilitate understanding the features of the present invention, reference will be made to FIG. 9 showing, in a sequence chart, how communications are conventionally proceeded to between an OLT and ONUs on bandwidths for up-stream direction. ONU1 and ONU2 transmit REPORT frames R to an OLT in order to notify the OLT of the amounts of traffic raised themselves. The OLT receives the REPORT frames R from all the ONU1 and ONU2 connected in time slots respectively allotted in advance to the ONUs. The OLT proceeds to computation through the DBA to thereby assign bandwidths to the respective ONU1 and ONU2. The DBA is performed in periodic time intervals, i.e. grant periods. The bandwidths thus assigned will be used in a grant period n following the grant period n−1 for receiving information on the amounts of traffic from the ONU1 and ONU2. The OLT transmits GATE frames G to the ONU1 and ONU2 to notify the latter of the bandwidths thus assigned. The ONU1 and ONU2 will know from GATE frames G when to transmit REPORT frames R and up-stream traffic, or data, in the following grant period n, and proceed to the transmission.

In the instant illustrative embodiment of the present invention, the ONUs 50d and 50e positioned at the long distance, i.e. long-distance ONUs, are arranged to always be allocated to the predetermined bandwidths for long distance 60 with fixed values. The ONUs 50d and 50e therefore do not submit a bandwidth allocation request, namely do not request the amount of transmission, which means no REPORT frame is transmitted. Therefore, the OLT 10 transmits to the long-distance ONUs 50d and 50e GATE frames simply including an instruction on up-stream data transmission and no instruction on REPORT frame transmission. The long-distance ONUs 50d and 50e are responsive to the GATE instruction to use the bandwidths allocated with the predetermined values, i.e. predetermined ones 64 of the bandwidths for long distance 60 to transmit data to the OLT 10 in time with a time slot predetermined for receiving up-stream data.

Particularly, in the present illustrative embodiment, the middle-distance ONU 50d resides at a distance such that a REPORT frame, when transmitted in response to a GATE frame received, would not have been in time for a REPORT reception time slot in the next grant period n. However, if time required for generating and transmitting such a REPORT frame is not provided, data can arrive at the OLT 10 in time for a data reception time slot for short-distance ONU class 51. ONUs located at such a distance may be referred to as middle-distance ONUs. With the instant embodiment, a bandwidth for short distance 62 which would have been allocated to a short-distance ONU class 51 but remains unused as a residual bandwidth will be allocated to the middle-distance ONU 52M, thus reducing such a residual bandwidth and improving the bandwidth usability.

Figure 3:
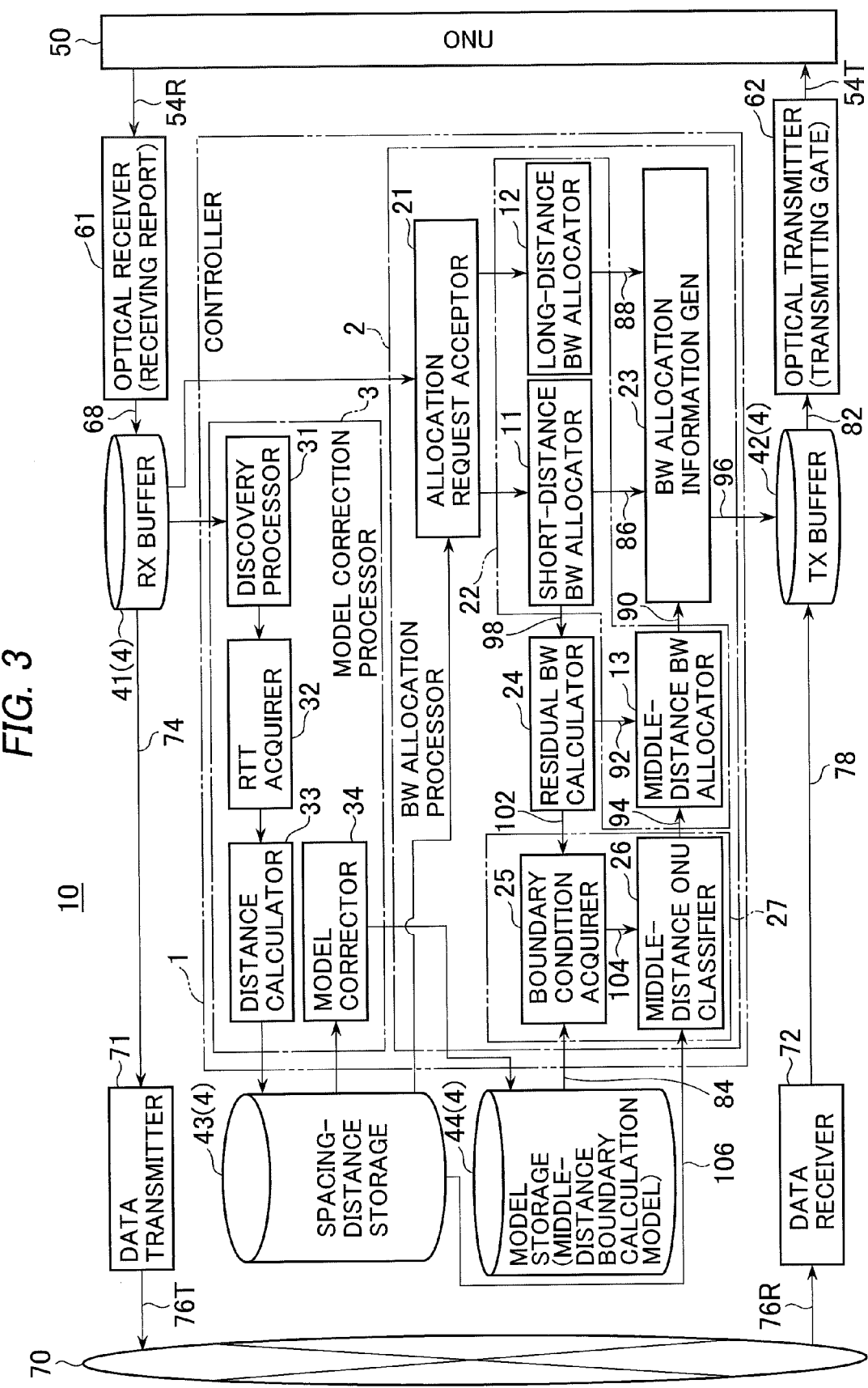
FIG. 3 is a schematic block diagram showing the configuration of the OLT in accordance with the illustrative embodiment.

Now, reference will be made to FIG. 3, which is a schematic block diagram showing the configuration of the OLT 10 of the embodiment shown in FIG. 1. This figure mainly shows functional blocks related to a dynamic allocation of bandwidths in the embodiment. However, the OLT 10 may include functional blocks attaining other functions, such as priority control.

Those functional blocks shown may be implemented by hardware, such as a processor system or elements including a central processor unit, or by software, such as computer program sequences. The functional blocks may also be implemented by hardware and software assembled cooperatively, as depicted in the figure. Specifically, such a computer, or processor system, has a computer program installed and functions, when executing the computer program, as part of, or the entirety of, the OLT 10. In this connection, the word "circuit" or "unit" may be understood not only as hardware, such as an electronics circuit, but also as a function that may be implemented by software installed and executed on a computer. Those skilled in the art will thus understand that those functional blocks can be implemented in various combinations of hardware and software.

In the illustrative embodiment, the OLT 10 generally includes a controller 1, storages 4, an optical receiver 61 and an optical transmitter 62 adapted for receiving and transmitting data from and to the ONUs 50, respectively, and a data transmitter 71 and a data receiver 72 transmitting and receiving data to and from the network 70, respectively. The storages 4 comprises a reception (RX) buffer 41, a transmission (TX) buffer 42, a spacing-distance storage 43 and a model storage 44

The OLT 10 may be implemented by a general-purpose computer, not specifically shown, including a CPU (Central Processing Unit), a ROM (Read-Only Memory), a RAM (Random-Access Memory), an HDD (Hard Disc Drive) or the like, and by program sequences directing the computer to function as the constituent elements included in the OLT 10.

The storages 4 may be implemented by a memory device or devices adapted for storing data, such as an HD, RAM and/or an optical disk. The storages 4 include the reception and transmission buffers 41 and 42 temporarily storing data, and the spacing-distance storage 43 storing identifications, e.g. LLIDs (Logical Link IDentifications), of the ONUs 50 and data on spacing distances from the OLT 10 to the respective ONUs 50 associated with LLIDs by a distance calculator 33 described below. The storages 4 further include the model storage 44 storing data on a middle-distance boundary calculation model also described below.

The optical receiver 61 is adapted to receive an optical signal 54R transmitted from the ONUs 50 to photo-electrically convert the optical signal 54R into corresponding electric data or signal 68. Then, photo-electrically converted data 68 are temporarily held in the reception buffer 41. Signals or data are designated with reference numerals of interconnections on which they are conveyed.

The reception buffer 41 functions as temporarily holding the data 68 photo-electrically converted by the optical receiver 61. The held data may include up-stream data, i.e. data to be transmitted to the network 70, data for requesting bandwidth allocation, and the like. The up-stream data mean data transmitted from a subscriber terminal personal computer, not shown, toward the network 70.

The data transmitter 71 serves as getting the up-stream data 74 held temporarily in the reception buffer 41 to transmit the data 76T to the network 70.

The data receiver 72 serves as receiving down-stream data 76R, i.e. data flowing in the down-stream direction transmitted from the network 70 to the subscriber terminal personal computer, and temporarily storing the data 78 in the transmission buffer 42.

The transmission buffer 42 serves as temporarily holding the down-stream data 78 received by the data receiver 72. The transmission buffer 42 also temporarily holds information on bandwidths and time slots allocated to the ONUs 50, and the like transferred from the controller 1.

The optical transmitter 62 adapted to get the down-stream data 82 temporarily held in the transmission buffer 42 to electro-optically convert the down-stream data to a corresponding optical signal 54T, and transmits the latter to the ONUs 50. Likewise, GATE frames including information on bandwidths time slots allocated will be transmitted to a destination or destinations of the ONUs 50.

To the ONUs 50, the respective time slots different from each other may be allocated. Information on time slots to be transmitted to the ONUs 50 includes designations of a start time of transmitting data and the amount of the data to be transmitted. Alternatively, this information may include designations of a start time of transmitting data and an allowable period of time for transmitting the data, or designations of a start and an end time of transmitting data.

The controller 1 generally includes a bandwidth (BW) allocation processor 2 and a model correction processor 3. The controller 1 is adapted to entirely control the components and elements included in the OLT 10.

Figure 4:
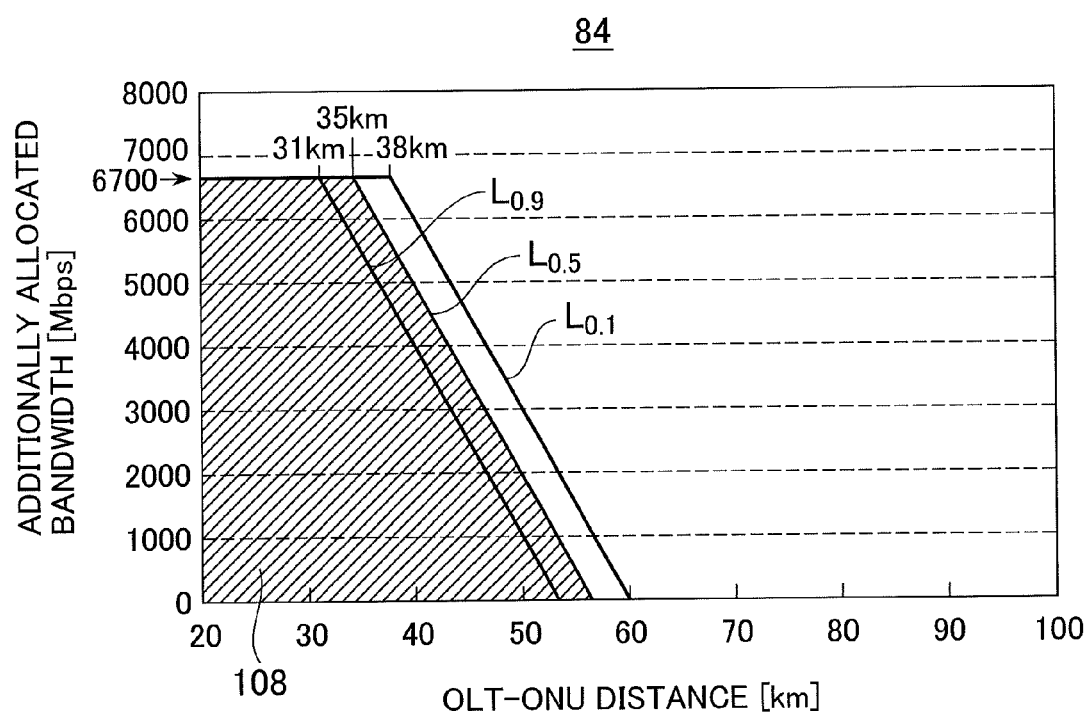
FIG. 4 shows in a graph an example of middle-distance boundary calculation model representing the relationship of allocated bandwidths with respect to OLT-ONU distance.

The model correction processor 3 is adapted for generating a middle-distance boundary calculation model 84, FIG. 4, and correcting the model 84 stored in the model storage 44. The model correction processor 3 includes a discovery processor 31, an RTT (Round Trip Time) acquirer 32, a distance calculator 33, and a model corrector 34, which are interconnected as depicted.

The discovery processor 31 attains one of the functions of the GE-PON, which function detects an ONU 50 connected to the GE-PON network 100 to establish data communication between the ONU 50 and the OLT 10. The discovery processor 31 controls the optical transmitter 62 to transmit a confirmation signal to the ONU 50, and determines when the optical receiver 61 has received from the ONU 50 a response signal responding to the confirmation signal. At this time, the discovery processor 31 times a period of time RTT from the confirmation signal being transmitted to the ONU 50 to the response signal being received from that ONU 50.

The RTT acquirer 32 functions as acquiring from the discovery processor 31 the RTT of each ONU 50 measured by the discovery processor 31 to output the acquired RTT of that ONU 50 to the distance calculator 33.

The distance calculator 33 may be notified of such an RTT merely when the RTT acquirer 32 acquires from the discovery processor 31 an RTT having its value different from that of the RTT acquired immediately precedingly thereto from the discovery processor 31, or when the acquired value of the RTT increases or decreases, which means the ONUs 50 connected to the OLT 10 increase or decrease. Thus, the model corrector 34, described below, will correct, when the above conditions are satisfied, data on the middle-distance boundary calculation model 84 stored in the model storage 44.

The distance calculator 33 is adapted to calculate a spacing distance from the OLT 10 to the ONUs 50 on the basis of the RTT and a transmission rate between the OLT 10 and the ONUs 50. The calculated spacing distances of the ONUs 50 are stored in the spacing-distance storage 43 together with identifications, such as LLIDs, of the ONUs 50. In this way, for each ONU 50, data on the spacing distance to the ONU 50 from the OLT 10 are stored in the spacing-distance storage 43 in connection with its identification, e.g. LLID. Thus, the spacing-distance storage 43 contains data on the distances between the OLT 10 and the ONUs 50a, 50b, . . . , 50e, in the illustrative embodiment. In the embodiment, the transmission rate for estimating spacing distances is set to the optical transmission velocity over optical fiber, 5 ns/m.

The model corrector 34 is adapted for correcting data on the middle-distance boundary calculation model 84 stored in the model storage 44 on the basis of, for example, information on the spacing distance to each ONU 50 stored in the spacing-distance storage 43, and the transmission rate and data rate. The invention is not restrictive to that specific value.

For example, the middle-distance boundary calculation model 84, FIG. 4, stored in the model storage 44 will be generated or corrected by the model corrector 34 in a fashion described below. The distance calculator 33 makes the spacing distances between the OLT 10 and the ONUs 50 associated with the identifications, such as LLIDs, of the ONUs 50 to store both of them in the spacing-distance storage 43.

First, the model corrector 34 classifies the ONUs 50 into the short- and long-distance ONU classes 51 and 52 on the basis of the spacing distances stored in the spacing-distance storage 43. The classification condition on the dividing line of the short-distance ONU class 51 may be, for example, whether or not ONUs 50 reside at a spacing distance shorter than 20 km from the OLT 10. In the GE-PON system 100 of the present embodiment, as an example, the OLT 10 may be connected to thirty short-distance ONUs 51 having spacing distances shorter than 20 km, one middle-distance ONU 52M having its spacing distance of 45 km, and one long-distance ONU 50L having its spacing distance of 60 km. Also, the latter ONUs 50M and 50L may further be classified into the long-distance class 52 in generic. Additionally, the data rate, and hence communication bandwidths, in the GE-PON system 10 may be equal to 10 Gbps. Those specific values are merely illustrative and do not restrict the invention.

With this data rate, the bandwidths for short and long distances will be set. Per long-distance ONU 52, the bandwidth for long distance 64 having its bandwidth of 150 Mbps predetermined is assigned. This means that the bandwidths for long distance 64 are allocated to the two long-distance ONUs 52, which will occupy the bandwidths 60 extending 150 Mbps×2=300 Mbps. Hence, the bandwidths for short distance 56 will be allocated to extend 10 Gbps−300 Mbps=9700 Mbps at the maximum. Per short-distance ONU 51, the minimum guaranteed bandwidth 56 of 100 Mbps is allocated. This means that the minimum guaranteed bandwidths for short distance 56 will occupy the bandwidths equal to 100 Mbps×thirty ONUs=3000 Mbps.

Under those circumstances, when communications between the OLT 10 and the short-distance ONUs 51 do not exceed the guaranteed minimum bandwidths 56, the residual bandwidth 62 of 9700 Mbps−3000 Mbps=6700 Mbps will be caused at the maximum. According to the middle-distance boundary calculation model 84 shown in FIG. 4, the maximum value of the bandwidth to additionally be allocated to the ONUs 50 is equal to 6700 Mbps under the condition that the additionally allocated bandwidth) does not exceed the residual bandwidth 62.

FIG. 4 plots middle-distance boundary lines L which are to classify the long-distance ONUs 52 into the middle- and long-distance ONU classes 52M and 52L, and to indicate a data transmission limitative distance which is in inverse proportion to the additionally allocated bandwidth. The data transmission limitative distance is defined as a limitative distance corresponding to a period of time, or time slot, which is allocated to an ONU 50 and commences when the OLT 10 transmits a GATE frame to that ONU 50, and within which the OLT 10 can receive data the ONU 50 transmits on the bandwidth allocated thereto.

Well, reference will be made to FIG. 5 to describe a procedure for generating the middle-distance boundary calculation model 84 shown in FIG. 4. Linear formulae defining the middle-distance boundary lines L ($L_{0.1}$, $L_{0.5}$, and $L_{0.9}$) will be obtained in the following manner. First, an expression (1) is used to calculate the time $RTT_{mid}$ which defines a period of time in the OLT 10 from the start timing of transmitting a GATE frame toward an ONU 50 to the completion timing of receiving data from the ONU 50, and then uses an expression (2) to calculate the time $T_t$ required for one-way transmission.

$$RTT_{mid} = 2 \times T_{grant} - (T_{check} + T_{report} + T_{rest} + T_{mid}) \quad (1)$$

$$T_t = \frac{RTT_{mid} - T_{gate}}{2} \quad (2)$$

In the above expressions, $T_{grant}$ is the time length of a grant period, and is set to 340 μs in the instant embodiment, and $T_{check}$ is a time length required for calculating a residual bandwidth in a bandwidth allocation process. It is to be noted that the $T_{check}$ is a time length obtained by multiplying a ratio value p by a time length assigned for processing bandwidth allocation, 85 μs in the embodiment, and is prepared, in the bandwidth allocation process, for calculating the residual bandwidth. The smaller ratio value p, the more rapidly the residual bandwidth is confirmed after the start of the calculation. That makes it possible to start transmitting GATE frames earlier in grant periods to thereby dispose middle-distance ONUs in more extensive areas.

Further, $T_{report}$ is a period of time in which a REPORT frame transmitted from the short-distance ONU 51 can be received. $T_{report}$ is set to a predetermined value of 5 µs in the instant embodiment.

In the expression (1), $T_{rest}$ is a time length required for the OLT 10 to receive data which the middle-distance ONU 52M has transmitted at the maximum transmittable volume over the bandwidth additionally allocated by the OLT 10 to that ONU 52M and obtained from the bandwidth allocation information included in a GATE frame. $T_{rest}$ may be represented by the number of time slots. $T_{rest}$ is a variable proportional to the additionally allocated bandwidth.

$T_{mid}$ is a time length required for receiving the maximum data volume corresponding to a bandwidth predetermined for middle distance allocated to the middle-distance ONU 52M, and is set in the present embodiment to 5 µs, which is required for receiving the predetermined bandwidth of 150 Mbps.

$T_{gate}$ is a time length required from when an ONU 50 received a GATE frame from the OLT 10 until the ONU 50 has transmitted to the OLT 10 data of the maximum transmittable volume on the additionally allocated bandwidth indicated by bandwidth allocation information included in the GATE frame. $T_{gate}$ is set to a predetermined value of 50 µs in the instant embodiment.

The time $T_t$ obtained by the expression (2) is then multiplied by the transmission rate of light 5 ns/m on optical fiber to obtain a distance, which will be a boundary distance, or data transmission limitative distance, for determining, when the additionally allocated bandwidth, proportional to $T_{rest}$, is allocated to an ONU located at that distance, that this ONU is a middle-distance ONU 52M. Thus, on the basis of the additionally allocated bandwidth, proportional to $T_{rest}$, and the boundary distance, i.e. data transmission limitative distance, dots are obtained which form the middle-distance boundary lines L.

While the variable value $T_{rest}$ varies, boundary distances, or data transmission limitative distances, will be calculated in the fashion as described above to thereby obtain the middle-distance boundary lines L. Then, on the basis of the middle-distance boundary lines L and the above-described maximum value (6700 Mbps) of the additionally allocated bandwidth, the middle-distance boundary calculation model shown in FIG. 4 can be obtained.

It is to be noted that the middle-distance boundary lines L are downward sloping rightwards in the figure with respect to the distance between the OLT 10 and the ONUs 50. Because, in the middle-distance boundary calculation model shown in FIG. 4, for example, an ONU 50 located 40 km away from the OLT 10 may receive a GATE frame with a delay time proportional to the distance from the OLT 10 to that ONU 50, and further, even if the ONU 50 transmits data on the residual bandwidth with the maximum value (6700 Mbps) entirely allocated as the additionally allocated bandwidth to that ONU 50, then the OLT 10 would fail to receive the entire data within its receivable time. Therefore, on the middle-distance boundary line $L_{0.5}$, the ONU 50 located 40 km away from the OLT 10, i.e. middle-distance ONU 52M, when having its bandwidth of 5000 Mbps additionally allocated, may transmit data within the receivable time of the OLT 10 at the maximum efficiency.

Returning to FIG. 3, the bandwidth allocation processor 2 is adapted to be responsive to a bandwidth allocation request from an ONU 50 to dynamically allocate a bandwidth to the ONU 50. The bandwidth allocation processor 2 includes an allocation request acceptor 21, bandwidth allocators 22, a bandwidth allocation information generator 23, a residual bandwidth calculator 24, a boundary condition acquirer 25 and a middle-distance ONU classifier 26, which are interconnected as shown. The bandwidth allocators 22 may comprise a short-distance bandwidth allocator 11, a long-distance bandwidth allocator 12, and a middle-distance bandwidth allocator 13, which are interconnected as illustrated.

Description will be made on those components and elements included in the bandwidth allocation processor 2. The allocation request acceptor 21 is adapted for acquiring a bandwidth allocation request, or the requested amount of transmission, included in a REPORT frame, and using the spacing distance to the ONU 50 having transmitted the REPORT frame to classify the ONU 50 into either a short- or long-distance ONU class.

More specifically, the allocation request acceptor 21 acquires and analyzes a bandwidth allocation request, or the requested amount of transmission, included in the REPORT frame temporarily stored in the reception buffer 41, and extracts information, such as LLID on the ONU 50 having transmitted the REPORT frame. Next, the allocation request acceptor 21 acquires from the spacing-distance storage 43 the identifications, e.g. LLIDs, of all the ONUs 50 and the extracted spacing distances to the ONUs 50. Then, the allocation request acceptor 21 determines the spacing distance to classify the ONU 50 into either a short- or long-distance ONU class 51 or 52. The process will be transferred to the bandwidth allocators 22.

When the result of the determination indicates the short-distance ONU class 51, the process is shifted to the short-distance bandwidth allocator 11 in the bandwidth allocators 22. When the result indicates the long-distance ONU class 52, the process is shifted to the long-distance bandwidth allocator 12 in the bandwidth allocators 22. At this time, if the short-distance ONU 51 corresponds to the identification, e.g. LLID, extracted from the REPORT frame, then the bandwidth allocation request, or the requested amount of transmission, included in the REPORT frame is outputted to the short-distance bandwidth allocator 11.

The bandwidth allocators 22 function as allocating as a reception bandwidth a bandwidth for short or long distance to an ONU 50 according to the distance between the OLT 10 and the ONU 50. Specifically, to an ONU 50 positioned at short distance, i.e. classified into the short-distance ONU class 51, one of the bandwidths for short distance 56, FIG. 2A, is dynamically allocated depending on the bandwidth allocation request, or the requested amount of transmission. To an ONU 50 positioned at the long distance, i.e. classified into the long-distance ONU class 52, predetermined one of the bandwidths for long distance 64 is allocated. Then, after having allocated all the short-distance ONUs 51 to the bandwidths for short distance 56, the bandwidth allocators 22 will allocate remaining one or ones of the bandwidths for short distance, i.e. residual bandwidth or bandwidths, 62 to a middle-distance ONU or ONUs, such as ONU 52M, classified as the long-distance ONU class 52.

In the bandwidth allocators 22, the short-distance bandwidth allocator 11 is a processor responsive to a bandwidth allocation request, i.e. the requested amount of transmission, included in a REPORT frame from a short-distance ONU 51 for dynamically allocating the short-distance ONU 51 to a bandwidth for short distance 56. The bandwidth allocators 22 may be adapted to use, for example, a known DBA scheduler for the bandwidth allocation. After the allocation, the short-distance bandwidth allocator 11 feeds the bandwidth allocation information generator 23 and the residual bandwidth calculator 24 with information 86 on the bandwidths thus allocated to the short-distance ONUs 51.

The long-distance bandwidth allocator 12 is a processor for allocating the long-distance ONUs 52 to the predetermined one or ones of the bandwidths for long distance. After the allocation, the long-distance bandwidth allocator 12 provides the bandwidth allocation information generator 23 with information 88 on the bandwidths thus allocated to the long-distance ONUs 52.

The middle-distance bandwidth allocator 13 is a processor for producing, on the basis of a residual bandwidth 62 calculated by the residual bandwidth calculator 24 and the identification of a middle-distance ONU 52M extracted, or classified, by the middle-distance ONU classifier 26, both described below, instruction information 90 on allocating the residual bandwidth 62 to the middle-distance ONU 52M to deliver the information to the bandwidth allocation information generator 23. When the middle-distance bandwidth allocator receives from the residual bandwidth calculator 24 information 92 that no residual bandwidth exists, that is, the residual bandwidth value=0, or from the middle-distance ONU classifier 26 information 94 that no ONUs 50 are classified into a middle-distance ONU, the middle-distance bandwidth allocator 13 provides the bandwidth allocation information generator 23 with instruction information 90 on allocating no bandwidths.

The bandwidth allocation information generator 23 is adapted to receive bandwidth allocation information 86, 88 and 90 on bandwidths allocated to the respective ONUs 50 from the short-distance bandwidth allocator 11, the long-distance bandwidth allocator 12 and the middle-distance bandwidth allocator 13 in the bandwidth allocators 22 to produce GATE frames 96 including the bandwidth allocation information for those ONUs 50 and store them in the transmission buffer 42. Thus, in the buffer 42, the GATE frames having the destinations thereof to the respective ONUs 50 are stored. The GATE frames containing the bandwidth allocation information will be transmitted to the destined ONUs 50 by the optical transmitter 62.

The bandwidth allocation information generator 23, when having acquired the bandwidth allocation information, allocates time slots different from each other to the ONUs 50 on the basis of the bandwidth allocation information, and produces information on time slot designating the start time of data transmission and the amount of data to be transmitted. The bandwidth information generator 23 will set the information in the GATE frames together with the bandwidth allocation information.

Now, when the bandwidth allocation information generator 23 acquires from the middle-distance bandwidth allocator 13 the instruction information 90 on allocating no bandwidths, it means there exists no middle-distance ONU, such as ONU 52M. By contrast, whenever the bandwidth allocation information generator 23 receives from the middle-distance bandwidth allocator 13 the instruction information 90 on allocating the residual bandwidth 62 to the middle-distance ONU 52M, it will allocate predetermined one of the bandwidths for long distance 64 as well as the residual bandwidth 62 in the bandwidths for short distance 58 to the middle-distance ONU 52M.

The residual bandwidth calculator 24 is adapted to acquire from the short-distance bandwidth allocator 11 information 98 on the bandwidth allocated to the short-distance ONU 51, and calculates a bandwidth 62 remaining unassigned in the bandwidths for short distance 58, that is, residual bandwidth, after the bandwidths for short distance 56 have been allocated to all the short-distance ONUs 51. In turn, the residual bandwidth calculator 24 determines whether or not a residual bandwidth 62 remains unassigned. When a residual bandwidth 62 exists, namely, residual bandwidth value>0, information 102 and 92 on the residual bandwidth 62 is outputted to the boundary condition acquirer 25 and the middle-distance bandwidth allocator 13. By contrast, when no residual bandwidth remains unassigned, namely, residual bandwidth value=0, information 92 that no residual bandwidth exists is outputted to the middle-distance bandwidth allocator 13.

The boundary condition acquirer 25 serves as receiving information 102 on a residual bandwidth from the residual bandwidth calculator 24, and then acquiring the middle-distance boundary calculation model 84 from the model storage 44 to obtain a boundary condition 104.

The middle-distance ONU classifier 26 uses the boundary condition 104 acquired by the boundary condition acquirer 25 and the spacing distance 106 of the long-distance ONUs 52 stored in the spacing-distance storage 43 to determine which ONU 50 is of a middle-distance ONU class 52M. Then, the classifier 26 further classifies the ONUs 50, already classified into the long-distance class 52, into the middle- and long-distance classes 52M and 52L. The boundary condition acquirer 25 and middle-distance ONU classifier 26 form $ a middle-distance subscriber terminal classifier 27.

Next, if an ONU 50 is classified into the middle-distance ONU class 52M, the identification, e.g. LLID, of the middle-distance ONU 50 is outputted to the middle-distance bandwidth allocator 13. By contrast, if no ONUs 50 are classified into the middle-distance ONU class 52M, then information 94 that no appropriate ONU 50 exists is outputted to the middle-distance bandwidth allocator 13.

Reference will be made again to FIG. 4 to describe an example of process for determining the middle-distance ONU by using the middle-distance boundary calculation model 84. The middle-distance boundary lines L shown in FIG. 4 are boundaries classifying the long-distance ONUs 52 into the middle- and long-distance ONU classes. When referring to the value of residual bandwidth with a value on the axis of the additionally allocated bandwidth in the figure, the OLT-ONU distance on the middle-distance boundary lines L leads to a boundary distance, or data transmission limitative distance, for classifying an ONU 50 into the middle-distance ONU class 52M.

For example, on the middle-distance boundary line $L_{0.5}$ of the middle-distance boundary calculation model 84, FIG. 4, when the residual bandwidth takes the maximum value of 6700 Mbps of the additionally allocated bandwidth and the entire residual bandwidth is to be allocated, an ONU 50 having its OLT-ONU spacing distance equal to or shorter than 35 km will be classified into the middle-distance ONU class 52M, and allocated to a bandwidth of 6700 Mbps.

An ONU 50 located at a spacing distance longer than 35 km but inside the area defined by the boundary indicated by the middle-distance boundary line $L_{0.5}$, i.e. shaded region 108 in the figure, is classified into the middle-distance ONU class 52M. On the other hand, an ONU 50 located at a distance exceeding the boundary line, outside the boundary, is classified into the long-distance ONU class 52L.

For example, on the middle-distance boundary line $L_{0.5}$ of the middle-distance boundary calculation model 84 shown in FIG. 4, an ONU 50 located at a distance of 40 km classified into the middle-distance ONU class 52M is additionally allocated to a bandwidth of at most 5000 Mbps even when the residual bandwidth 62 of 6700 Mbps remains unallotted. On the other hand, an ONU 50 located at a distance of 60 km is classified into the long-distance ONU class 52L since it is located at a distance exceeding the boundary line, right hand side region in the figure, even when the residual bandwidth of 6700 Mbps remains unallotted. Similarly, on the middle-distance boundary line $L_{0.9}$, an ONU 50 located at a distance equal to or shorter than 31 km will be classified into the middle-distance ONU class 52M, and, on the middle-distance boundary line $L_{0.1}$, an ONU 50 located at a distance equal to or shorter than 38 km will be classified into the middle-distance ONU class 52M.

In summary, the middle-distance boundary calculation model 84 defines, as shown in FIG. 4, the shaded region 108 by the lines of the upper limit value of the residual bandwidth and the middle-distance boundary line $L_{0.5}$, and the vertical and vertical axes of the additionally allocated bandwidth and the OLT-ONU distance. If an ONU 50 takes its OLT-ONU distance in the shaded region 108, then the ONU 50 is classified into the middle-distance ONU class 52M. By referring to the location of that ONU 50, thus classified into the middle-distance ONU class 52M, the maximum value of the bandwidth in the region 108 will be allocated to that ONU 50 as the additionally allocated bandwidth 62.

FIG. 4 plots three middle-distance boundary lines $L_p$, where the ratio value p=0.1, 0.5 and 0.9 in the example. The ratio value p represents a ratio of the time length required for calculating the residual bandwidth to the whole time length for the bandwidth allocation process in a grant period $T_{grant}$ shown in FIG. 5. For example, the middle-distance boundary line $L_{0.5}$ where the ratio value p is equal to 0.5 represents that 50% of the whole time length for the bandwidth allocation process is required for calculating the residual bandwidth. The smaller ratio value p, the more rapidly the residual bandwidth is confirmed after the start of the calculation.

The OLT 10 having the configuration thus described will perform communication processing between the OLT 10 and the ONUs, as will be described with reference to FIG. 6. For example, at first, the short-distance ONUs 50 transmit REPORT frames including a bandwidth allocation request. The OLT 10, when having received the REPORT frame, calculates a residual bandwidth 62 in the bandwidths for short distance 58 on the basis of the bandwidth allocation request, or the requested amount of transmission, from each short-distance ONU 51. Then, according to the middle-distance boundary calculation model 84, if an ONU 50 is classified into the middle-distance ONU class 52M, then the OLT 10 transmits to the middle-distance ONU 52M a GATE frame including information on allocating the middle-distance ONU 52M to the predetermined bandwidth for long distance 64 and additionally to the residual bandwidth 62 in the bandwidths for short distance 58. At this time, the GATE frame to be transmitted to the middle-distance ONU 52M may include only an instruction of up-stream data transmission and not an instruction on REPORT frame transmission.

The middle-distance ONU 52M, when having received the GATE frame, processes the GATE frame to use the additionally allocated and predetermined bandwidths to transmit up-stream data.

The OLT 10 processes data α, β and γ transmitted from the short-distance ONU 51 on the bandwidth for short distance in order, and processes data transmitted from the middle-distance ONU 52M over the additionally allocated bandwidth 66 remaining unused in the bandwidths for short distance 58 and the predetermined bandwidth 66 in the bandwidths for long distance 60.

Figure 5:
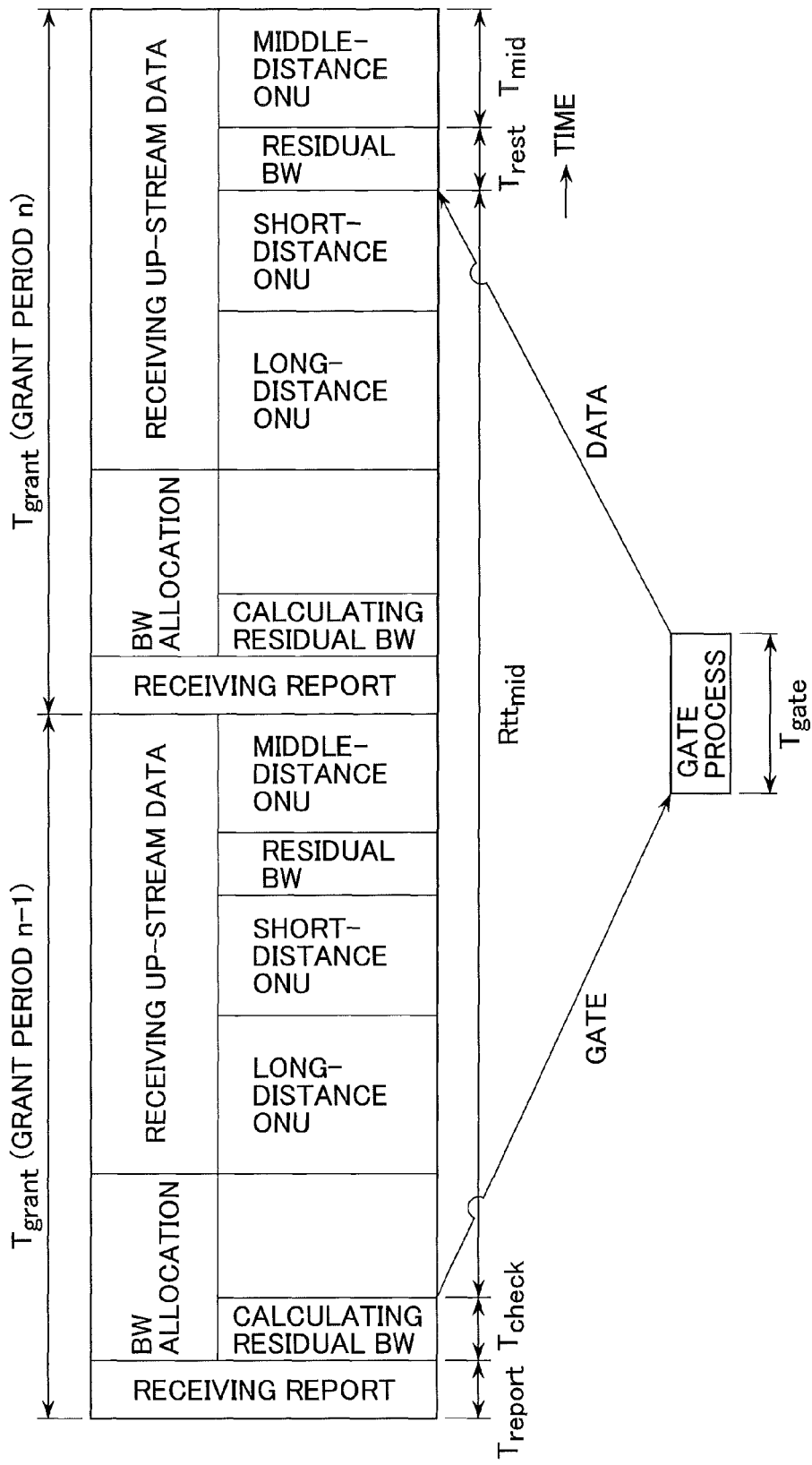
FIG. 5 conceptually shows an example of time required for a process of additionally allocating a bandwidth to a middle-distance ONU.
Figure 6:
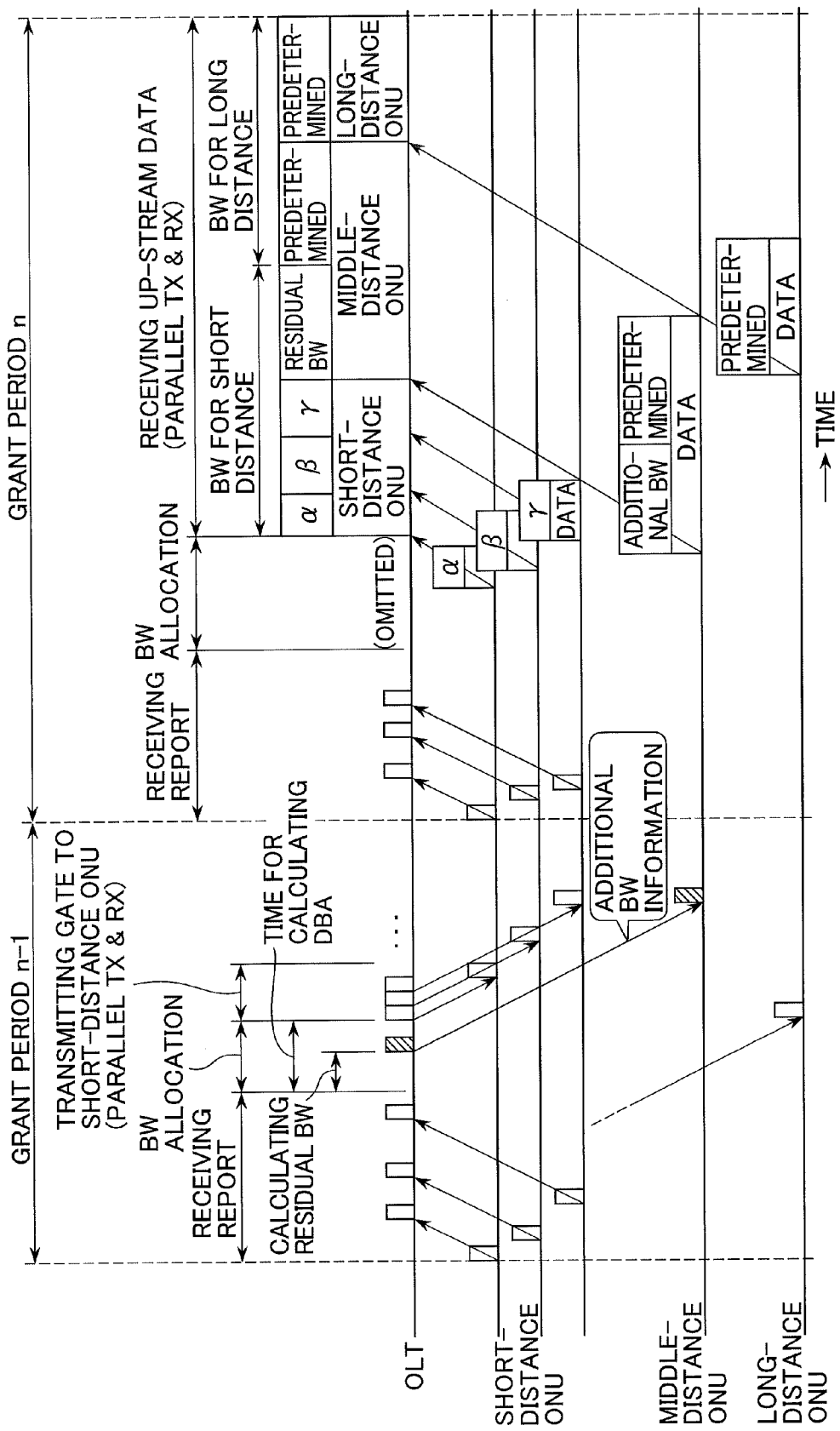
FIG. 6 conceptually shows in a timing chart an example of communication between the OLT and the ONU for adding the bandwidth to a middle-distance ONU.

Unlike FIG. 5, it is to be noted that FIG. 6 shows that data transmitted from the middle-distance ONU 52M are processed, and thereafter data transmitted from the long-distance ONU 52L are processed. In order to illustrate that the middle-distance ONU 52M uses predetermined one 64 of bandwidths for long distance 64 and a residual bandwidth 62 in the bandwidths for short distance 58, the order in the figure is thus exchanged for convenience.

The long-distance ONU 52L receives a GATE frame including information on allocating predetermined one 64 of the bandwidths for long distance 60. The GATE frame to be received by the long-distance ONU 52L may be a GATE frame transmitted by the OLT 10 in a grant period preceding by a plurality of periods to the grant period in which the long-distance ONU 52L receives the GATE frame. Then, the long-distance ONU 52L processes the received GATE frame, and uses the predetermined bandwidth 64 in the bandwidths for long distance 60 to transmit data to be transmitted in time with a period of time that is allocated to the ONU 52L in order that the OLT 10 may receive and process the data transmitted from the long-distance ONU 52L.

Figure 7:
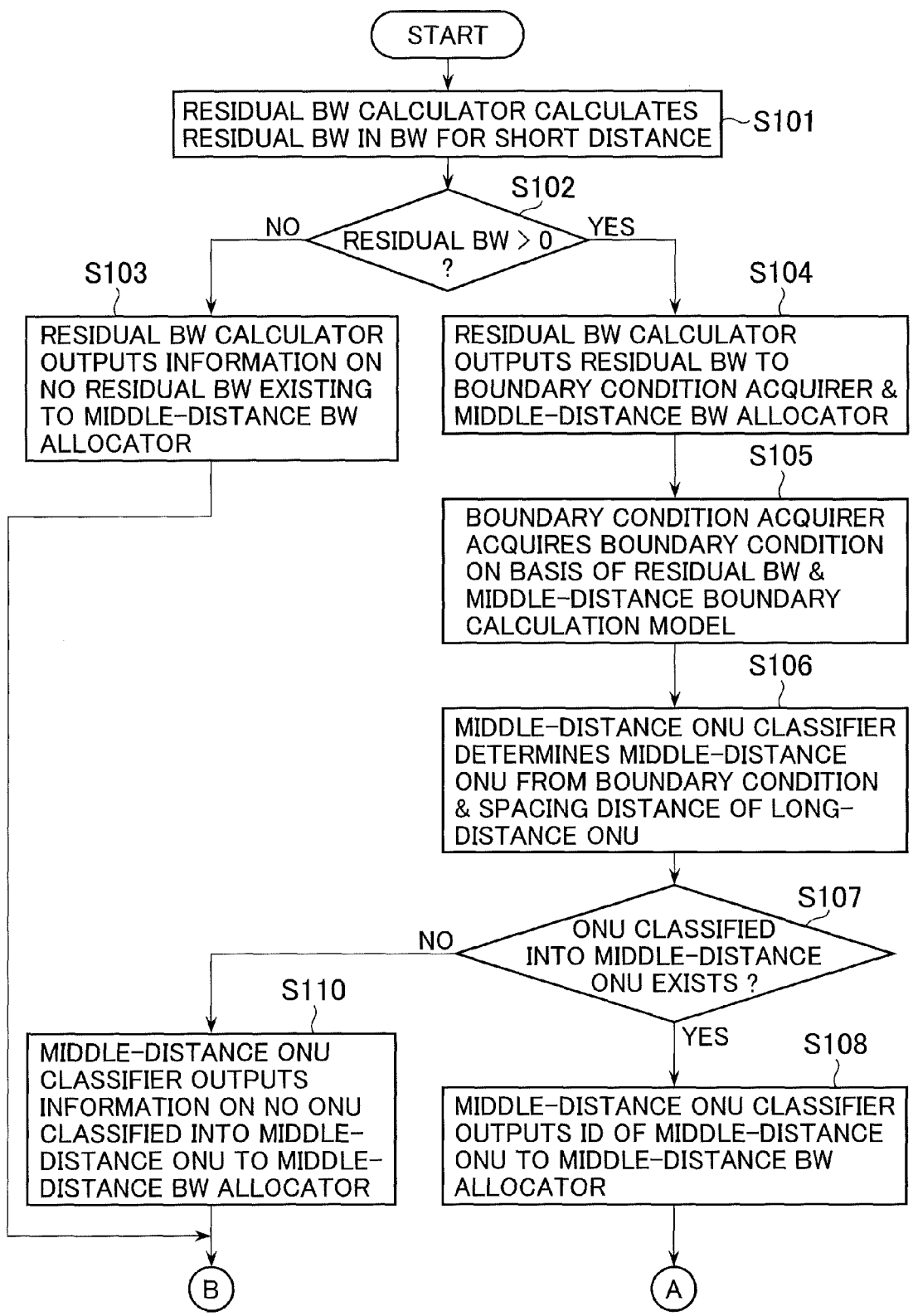
FIGS. 7 and 8 are a flowchart useful for understanding a process, operated by the OLT in accordance with the embodiment, of allocating a residual, bandwidth for short distance to the middle-distance ONU.
Figure 8:
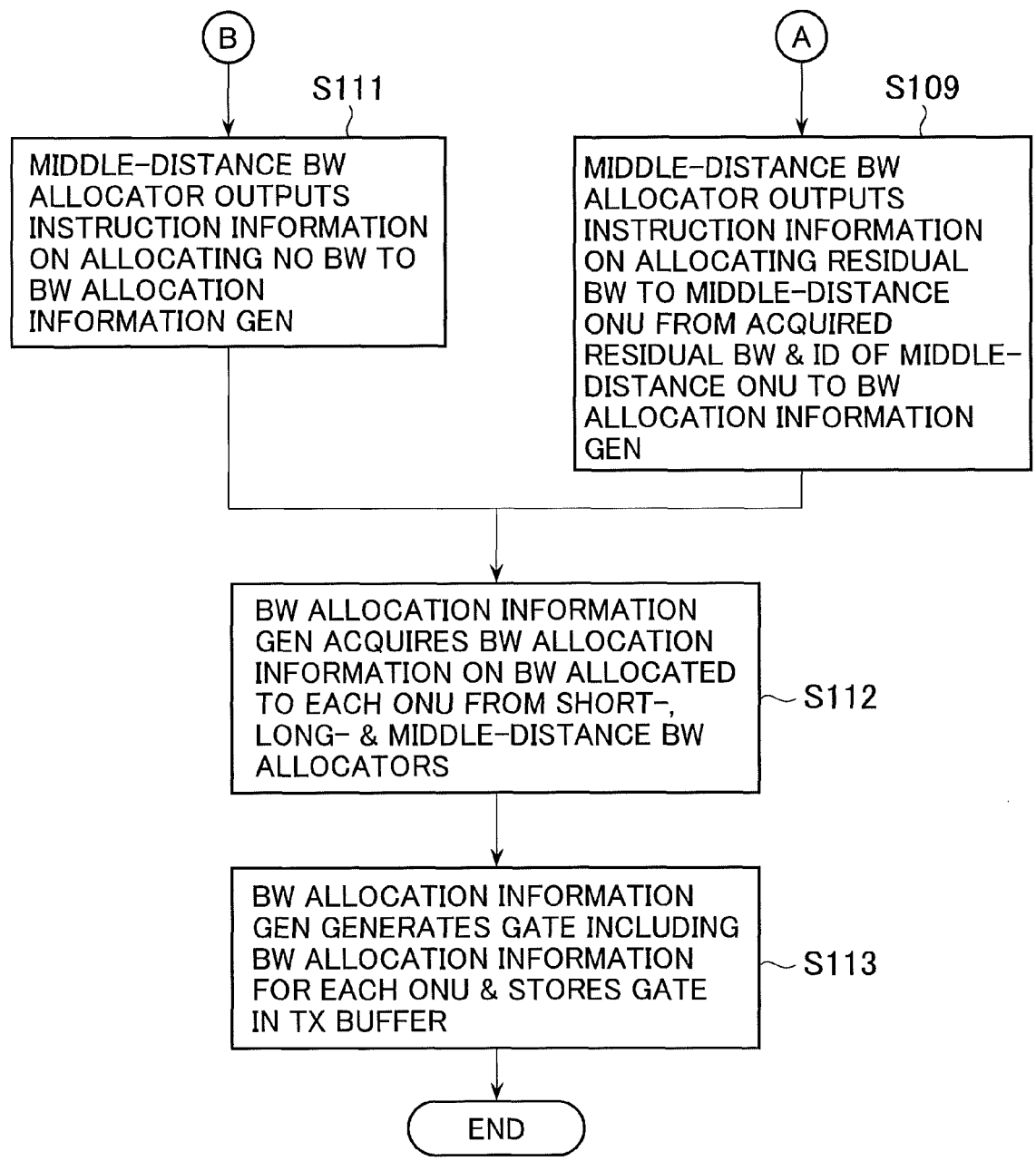

Next, reference will be made to FIGS. 7 and 8 to describe how the OLT 10 allocates the residual bandwidth 62 in the bandwidths for short distance 58 to the middle-distance ONU 52M. The flowcharts shown in FIGS. 7 and 8 illustrate processes proceeded to after the short-distance bandwidth allocator 11 and the long-distance bandwidth allocator 12 have finished their processes, and particularly after the short-distance bandwidth allocator 11 has fed the bandwidth allocation information generator 23 and the residual bandwidth calculator 24 with information on the bandwidths allocated to the short-distance ONUs 51.

First, the residual bandwidth calculator 24 acquires from the short-distance bandwidth allocator 11 information on the bandwidths allocated to the short-distance ONUs 51, and calculates a bandwidth remaining as a residual bandwidth 62 in the bandwidths for short distance 58 after having allocated the bandwidths for short distance 56 to all the short-distance ONUs 51 (step S101).

Next, the residual bandwidth calculator 24 determines whether or not the calculated value of the residual bandwidth 62 exceeds null to thereby determine whether or not a residual bandwidth 62 exists (step S102). When no residual bandwidth exists, i.e. the residual bandwidth value=0 (No in step S102), then the residual bandwidth calculator 24 provides the middle-distance bandwidth allocator 13 with information that no residual bandwidth exists (step S103). Then, a step S111, FIG. 8, will be processed.

By contrast, when a residual bandwidth 62 exists, i.e. the residual bandwidth value>0 (Yes in step S102), then the residual bandwidth calculator 24 outputs an appropriate residual bandwidth value to the boundary condition acquirer 25 and the middle-distance bandwidth allocator 13 (step S104).

The boundary condition acquirer 25, when having received the residual bandwidth 102 from the residual bandwidth calculator 24, acquires a boundary condition 104 on the basis of the middle-distance boundary calculation model 84 acquired from the model storage 44 (step S105). Then, the boundary condition 104 is outputted to the middle-distance ONU classifier 26.

The middle-distance ONU classifier 26, when having received the boundary condition 104 from the boundary condition acquirer 25, also acquires the spacing distance 106 of the long-distance ONUs 52 from the spacing-distance storage 43 to classify the long-distance ONUs 52 into the middle- and long-distance ONU classes 52M and 52L (step S106).

Then, in the determination step S107 for middle-distance ONU class, if an ONU or ONUs 50 are classified into the middle-distance ONU class 52M (Yes), then the middle-distance ONU classifier 26 extracts the identification, such as LLID, of the middle-distance ONU 52M from the spacing-distance storage 43 to output that information 94 to the middle-distance bandwidth allocator 13 (step S108). Then, the middle-distance bandwidth allocator 13 will process a step S109, FIG. 8.

The middle-distance bandwidth allocator 13 receives the information 94 on the residual bandwidth outputted by the residual bandwidth calculator 24 in the step S104 and the identification, such as LLID, of the middle-distance ONU 52M outputted by the middle-distance ONU classifier 26 in the step S108, and produces instruction information 90 on allocating the residual bandwidth 62 to the middle-distance ONU 52M to the bandwidth allocation information generator 23 (step S109).

By contrast, in the determination step S107, FIG. 7, for the middle-distance ONU, if no ONUs 50 are classified into the middle-distance ONU class 52M (No), that is, the ONU in question is a long-distance ONU 52L, then the middle-distance ONU classifier 26 outputs information 94 that no ONU is classified into the middle-distance ONU class to the middle-distance bandwidth allocator 13 (step S110). Then, the middle-distance bandwidth allocator 13 will process a step S111, FIG. 8.

The middle-distance bandwidth allocator 13 generates, when having received the information 92 that no residual bandwidth exists outputted by the residual bandwidth calculator 24 in the step S103 or the information 94 that no ONU is classified into the middle-distance ONU outputted by the middle-distance ONU classifier 26 in the step S110, the instruction information 90 on allocating no bandwidth to output the information 90 to the bandwidth allocation information generator 23 (step S111).

The bandwidth allocation information generator 23 acquires the bandwidth allocation information 86, 88 and 90 on the bandwidths allocated to those ONUs 50 from the bandwidth allocators 22, namely, the short-distance bandwidth allocator 11, the long-distance bandwidth allocator 12 and the middle-distance bandwidth allocator 13, as well as the instruction information 90 from the middle-distance bandwidth allocator 13 (step S112). In turn, the bandwidth allocation information generator 23 generates a GATE frame including the bandwidth allocation information for each ONU 50, and stores the GATE frames in the transmission buffer 42 (step S113).

The above-described operation will cause the GATE frames stored in the transmission buffer 42 to be transmitted to the targeted ONUs 50 by the optical transmitter 62. The ONUs 50 will thus have the respectively appropriate bandwidths allocated.

Particularly, when the bandwidth allocation information generator 23 acquires the instruction information 90 on allocating the residual bandwidth 92 to the middle-distance ONU 52M from the middle-distance bandwidth allocator 13 (steps S109 through S112), the middle-distance ONU 52M classified in the long-distance ONU class 52 is allotted to the predetermined bandwidth 64 among the bandwidths for long distance 60 and also the residual bandwidth 62 in the bandwidths for short distance while the long-distance ONU 52L classified in the long-distance ONU class 52 is allotted only to the predetermined bandwidth 64 in the bandwidths for long distance 60. When the bandwidth allocation information generator 23 acquires the instruction information 90 on allocating no bandwidth from the middle-distance bandwidth allocator 13 (steps S111 through S112), the long-distance ONUs 52 are allotted only to the predetermined bandwidths 64 in the bandwidths for long distance 60.

While the present invention has been described with reference to the particular illustrative embodiments, it is not to be restricted by the above-described embodiment, which may, however, be changed or modified without departing from the scope and spirit of the present invention. For example, although the OLT 10 in the instant embodiment can meet a bit rate of 10 Gbps, it may meet a bit rate of 1 Gbps.

The entire disclosure of Japanese patent application No. 2010-191788 filed on Aug. 30, 2010, including the specification, claims, accompanying drawings and abstract of the disclosure, is incorporated herein by reference in its entirety.

What we claim is:

1. A bandwidth allocating control apparatus for use in an optical communication base station forming an optical access system together with a plurality of optical communication subscriber terminal units and connected communicable with the subscriber terminal units, wherein said apparatus has a reception bandwidth from the subscriber terminal units divided into a bandwidth for short distance and a bandwidth for long distance, and said apparatus is responsive to a data transmission request received from any one of the subscriber terminal units to allocate the reception bandwidth on a basis of a communication distance from the base station to the one subscriber terminal unit so that, when the one subscriber terminal unit is classified into a short-distance subscriber terminal class, the bandwidth for short distance is allocated to the one subscriber terminal unit corresponding to a volume of data the one subscriber terminal unit requests to transmit, and, when the one subscriber terminal unit is classified into a long-distance subscriber terminal class, a predetermined bandwidth in the bandwidth for long distance is allocated to the one subscriber terminal unit, said apparatus comprising:

a residual bandwidth calculator for calculating a residual bandwidth of the bandwidth for short distance remaining unallocated after having allocated the reception bandwidth to the one subscriber terminal unit, when classified into the short-distance subscriber terminal class;

a middle-distance subscriber terminal classifier for using a middle-distance boundary calculation model defining a relationship between the residual bandwidth and the communication distance to further classify the one subscriber terminal unit, when classified into the long-distance subscriber terminal class, into a middle-distance subscriber terminal class or the long-distance subscriber terminal class; and a middle-distance bandwidth allocator for further allocating the residual bandwidth to the one subscriber terminal unit, when classified into the middle-distance subscriber terminal class in addition to the predetermined bandwidth allocated, said apparatus transmitting allocation information on allocating the residual bandwidth to the one subscriber terminal unit, when classified into the middle-distance subscriber terminal class.

2. The apparatus in accordance with claim 1, wherein the allocation information contains data for controlling the one subscriber terminal unit, and, when the one subscriber terminal unit is classified into the middle-distance subscriber terminal class, the allocation information is included in a GATE frame having a destination to the one subscriber terminal unit to be transmitted, the allocation information containing: an instruction on
disabling the one subscriber terminal unit from transmitting a REPORT frame in response to the GATE frame, when received;
an instruction on allowing the one subscriber terminal unit to transmit the data requested to be transmitted on the residual bandwidth and the predetermined bandwidth allocated; and
a data acceptance period of time for accepting the data allocated on the basis of the volume of the data requested to be transmitted by the one subscriber terminal unit.

3. The apparatus in accordance with claim 2, wherein the middle-distance boundary calculation model is obtained on the basis of a relationship between a maximum residual bandwidth obtained from a number of subscriber terminal units classified into the short-distance subscriber terminal class and a number of subscriber terminal units classified into the long-distance subscriber terminal class, and a data transmission limitative distance at which a subscriber terminal unit resides from the base station such that said apparatus can receive data, which the subscriber terminal unit transmitted over the allocated bandwidth, within the data acceptance period of time since said apparatus transmitted the GATE frame.

4. The apparatus in accordance with claim 3, wherein said base station is connected to the plurality of subscriber terminal units by optical fiber, and
the data transmission limitative distance is obtained by multiplying a transmission rate of light over the optical fiber by a time length $T_t$ obtained by following expressions:

$$RTT_{mid} = 2 \times T_{grant} - (T_{check} + T_{report} + T_{rest} + T_{mid}) \quad (1)$$

$$T_t = \frac{RTT_{mid} - T_{gate}}{2}, \quad (2)$$

where $RTT_{mid}$ is time from a start timing of transmitting the GATE frame toward a subscriber terminal unit to a completion timing of having received the data transmitted from the subscriber terminal unit,
$T_{grant}$ is a time length of a grant period,
$T_{check}$ is a time length required for calculating the residual bandwidth,
$T_{report}$ is a period of time in which the REPORT frame transmitted from a subscriber unit classified into the short-distance subscriber terminal class can be received,
$T_{rest}$ is a time length required for receiving the data transmitted by a subscriber terminal unit on the allocated bandwidth,
$T_{mid}$ is a time length required for receiving a maximum volume of data corresponding to the bandwidth allocated to a subscriber terminal unit classified into the middle-distance subscriber terminal class,
$T_{gate}$ is a time length required from when a subscriber terminal unit receives the GATE frame until data of a maximum transmittable volume have been transmitted to the base station on the bandwidth allocated to the subscriber terminal unit indicated by the allocation information included in the GATE frame, and
$T_t$ is a time length required for one-way transmission from a subscriber terminal unit to the base station.

5. The apparatus in accordance with claim 1, wherein the bandwidth is allocated by dynamic bandwidth allocation (DBA).

6. The apparatus in accordance with claim 5, wherein the communication distance is estimated on the basis of round-trip time (RTT) obtained by a discovery process.

7. A bandwidth allocating control apparatus connected to a plurality of optical communication units to transmit and receive data to and from the communication units, wherein
said apparatus has a reception bandwidth from the communication units divided into a bandwidth for short distance and a bandwidth for long distance, and
said apparatus is responsive to a data transmission request received from a communication unit to allocate the reception bandwidth on a basis of a communication distance from said apparatus to the communication unit such that, when the communication unit is classified into a short-distance communication class, the bandwidth for short distance is allocated to the communication unit corresponding to a volume of data the communication unit requests to transmit, and, when the communication unit is classified into a long-distance communication class, a predetermined bandwidth in the bandwidth for long distance is allocated to the communication unit,
said apparatus comprising:
a residual bandwidth calculator for calculating a residual bandwidth of the bandwidth for short distance remaining unallocated after having allocated the reception bandwidth to the communication unit, when classified into the short-distance communication class;
a middle-distance communication unit classifier for using a middle-distance boundary calculation model defining a relationship between the residual bandwidth and the communication distance to further classify the communication unit, when classified into the long-distance communication class, into a middle-distance communication class or the long-distance communication class; and
a middle-distance bandwidth allocator for further allocating the residual bandwidth to the communication unit, when classified into the middle-distance communication class in addition to the predetermined bandwidth allocated;
said apparatus transmitting allocation information on allocating the residual bandwidth to the communication unit, when classified into the middle-distance communication class.

8. A recording medium having a computer program recorded thereon, wherein said computer program, when running on a computer functioning as a bandwidth allocating control apparatus in an optical communication base station forming an optical access system together with a plurality of optical communication subscriber terminal units for optical communication with the subscriber terminal units, wherein
said apparatus has a reception bandwidth from the subscriber terminal units divided into a bandwidth for short distance and a bandwidth for long distance, and
said apparatus is responsive to a data transmission request received from any one of the subscriber terminal units to allocate the reception bandwidth on a basis of a communication distance from the base station to the one subscriber terminal unit so that, when the one subscriber terminal unit is classified into a short-distance subscriber terminal class, the bandwidth for short distance is allocated to the one subscriber terminal unit corresponding to a volume of data the one subscriber terminal unit requests to transmit, and, when the one subscriber terminal unit is classified into a long-distance subscriber terminal class, a predetermined bandwidth in the bandwidth for long distance is allocated to the one subscriber terminal unit, said computer program, when running on the computer, controlling the computer to function as:

a residual bandwidth calculator for calculating a residual bandwidth of the bandwidth for short distance remaining unallocated after having allocated the reception bandwidth to the one subscriber terminal unit, when classified into the short-distance subscriber terminal class;

a middle-distance subscriber terminal classifier for using a middle-distance boundary calculation model defining a relationship between the residual bandwidth and the communication distance to further classify the one subscriber terminal unit, when classified into the long-distance subscriber terminal class, into a middle-distance subscriber terminal class or the long-distance subscriber terminal class; and a middle-distance bandwidth allocator for further allocating the residual bandwidth to the one subscriber terminal unit, when classified into the middle-distance subscriber terminal class in addition to the predetermined bandwidth allocated;

said apparatus transmitting allocation information on allocating the residual bandwidth to the one subscriber terminal unit, when classified into the middle-distance subscriber terminal class.

9. The recording medium in accordance with claim 8, wherein said apparatus comprises a storage for storing the middle-distance boundary calculation model.

* * * * *